(12) United States Patent
McLennan et al.

(10) Patent No.: US 9,567,261 B2
(45) Date of Patent: Feb. 14, 2017

(54) LOW FORMALDEHYDE VINYL ESTER/ETHYLENE EMULSION COPOLYMERS

(75) Inventors: Alistair McLennan, Koenigstein (DE); Hendrikus C. M. Van Boxtel, Frankfurt am Main (DE)

(73) Assignee: CELANESE SALES GERMANY GMBH, Sulzbach (DE)

(*) Notice: Subject to any disclaimer, the term of this patent is extended or adjusted under 35 U.S.C. 154(b) by 47 days.

(21) Appl. No.: 14/396,506

(22) PCT Filed: Apr. 25, 2012

(86) PCT No.: PCT/IB2012/000982
§ 371 (c)(1), (2), (4) Date: Nov. 7, 2014

(87) PCT Pub. No.: WO2013/160711
PCT Pub. Date: Oct. 31, 2013

(65) Prior Publication Data
US 2015/0141553 A1    May 21, 2015

(51) Int. Cl.
| | |
|---|---|
| C04B 24/26 | (2006.01) |
| C04B 26/04 | (2006.01) |
| C08F 22/10 | (2006.01) |
| C08F 4/40 | (2006.01) |
| C08F 218/08 | (2006.01) |
| C04B 103/00 | (2006.01) |
| C04B 111/00 | (2006.01) |
| C04B 111/62 | (2006.01) |
| C08F 210/02 | (2006.01) |

(52) U.S. Cl.
CPC ........... *C04B 24/2623* (2013.01); *C04B 26/04* (2013.01); *C08F 4/40* (2013.01); *C08F 22/10* (2013.01); *C08F 218/08* (2013.01); *C04B 2103/0057* (2013.01); *C04B 2111/00637* (2013.01); *C04B 2111/62* (2013.01); *C08F 210/02* (2013.01); *Y10T 428/2982* (2015.01)

(58) Field of Classification Search
CPC ...... C04B 24/2623; C04B 26/04; C08F 22/10; C08F 4/40
USPC ............................................................ 524/5
See application file for complete search history.

(56) References Cited

U.S. PATENT DOCUMENTS

| | | | | |
|---|---|---|---|---|
| 6,576,698 | B1 * | 6/2003 | Weitzel | C08F 220/12 524/458 |
| 6,635,725 | B1 * | 10/2003 | Sata | C08F 210/02 526/210 |
| 6,716,941 | B2 | 4/2004 | Kerr et al. | |
| 6,787,594 | B1 * | 9/2004 | Goldstein | C08F 218/08 524/457 |
| 2007/0088120 | A1 | 4/2007 | Zecha et al. | |
| 2014/0171574 | A1 | 6/2014 | McLennan | |

FOREIGN PATENT DOCUMENTS

| | | | | |
|---|---|---|---|---|
| DE | WO 2008145489 | A1 * | 12/2008 | ............... C08F 2/22 |
| WO | 2008145489 | A1 | 12/2008 | |

OTHER PUBLICATIONS

Fidler et al. "Erythorbic acid is a potent enhancer of nonheme-iron absorption", Am. J. Clin. Nutr. (2004), Vo. 79, No. 1, pp. 99-102.*
International Search Report and Written Opinion issued in a corresponding application PCT/IB2012/000982 on Nov. 26, 2012.

* cited by examiner

*Primary Examiner* — Ling Choi
*Assistant Examiner* — Ronald Grinsted
(74) *Attorney, Agent, or Firm* — Roberts Mlotkowski Safran Cole & Calderon P.C.

(57) ABSTRACT

A vinyl ester/ethylene copolymer is prepared by emulsion copolymerization of a monomer mixture comprising at least one vinyl ester, ethylene, a stabilizing system comprising polyvinyl alcohol and a free radical redox polymerization initiator system comprising i-butyl hydroperoxide as an oxidizing agent and at least one of a sulfuric acid-based compound and erythorbic acid or a salt thereof as a reducing agent. The monomer mixture comprises from 70 wt % to 95 wt % of said at least one vinyl ester and from 5 wt % to 30 wt % of ethylene based on the total weight of monomers in said mixture and the copolymer has a formaldehyde content of less than 5.0 ppmw as determined by ISO-15173.

19 Claims, No Drawings

LOW FORMALDEHYDE VINYL ESTER/ETHYLENE EMULSION COPOLYMERS

CROSS-REFERENCE TO RELATED APPLICATIONS

The present Application is a U.S. National Phase of PCT/IB2012/000982 filed on Apr. 25, 2012. The disclosure of the PCT Application is hereby incorporated by reference into the present Application.

FIELD

The present invention relates to vinyl ester/ethylene emulsion copolymers, for example vinyl acetate/ethylene (VAE) emulsion copolymers, containing very low levels of formaldehyde and their use in self-leveling flooring screeds, ceramic tile adhesives and other adhesive and coating applications.

BACKGROUND

Aqueous emulsions containing copolymers of vinyl esters and ethylene, and especially vinyl acetate and ethylene (VAE copolymers) are well known as binders for paints and for adhesives for use in the wood, paper and packaging industries. It is also known to use vinyl ester/ethylene emulsion copolymers in powder form in self-leveling flooring screeds and ceramic tile adhesives. See, for example, U.S. Pat. No. 6,716,941 discussed in more detail below.

For an increasing number of applications, industry standards and/or government regulations require that emulsion copolymers be very low in residual monomer content and content of volatile organic compounds (VOCs). One VOC component which is frequently singled out for specific control is formaldehyde, since formaldehyde is suspected to be a human carcinogen and can be produced by decomposition of some components which are conventionally used in emulsion polymerization processes and products.

One potential source of formaldehyde in emulsion polymerization is the redox initiator system, since a common reducing agent used in such systems is sodium formaldehyde sulfoxylate, which can dissociate to form free formaldehyde. There is therefore significant interest in developing new redox initiator systems for emulsion polymerization which minimize or avoid the generation of formaldehyde, without impairing the properties of the resultant polymer. For example, in the case of use in self-leveling flooring screeds, it is important that the vinyl ester/ethylene copolymer exhibits good adhesive and flow properties and shows early strength on curing.

For example, U.S. Pat. No. 6,635,725 discloses a method for producing an ethylene-vinyl acetate copolymer aqueous emulsion comprising co-polymerizing monomers comprising ethylene and vinyl acetate by using a formaldehyde-free redox catalyst comprising a transition metal salt and an erythorbic acid, as the reducing agent thereof, and 1.8 to 10 mol of hydrogen peroxide, as an oxidizing agent thereof, per one mol of the erythorbic acid. The use of such a controlled amount of hydrogen peroxide is said to be necessary to avoid discoloration of the ccopolymer which is used as a binder for a paper coating composition.

According to the present invention it has now been found that a redox-system comprising a reducing agent based on erythorbic acid and/or sulfinic acid in combination with t-butyl hydroperoxide, as an oxidizing agent, is an effective formaldehyde-free initiator for the emulsion polymerization of a vinyl ester/ethylene monomer mixture. Moreover, when dehydrated into powder form, the resultant copolymer has excellent properties for use in self-leveling flooring screeds and ceramic tile adhesives.

U.S. Pat. No. 6,716,941 discloses a process for forming an ethylene-vinyl acetate copolymer dispersion in the presence of a surfactant-free stabilizing system consisting of polyvinyl alcohol, and in the presence of from 0 to 10 percent by weight of a seed polymer based on the weight of the dispersion, wherein said copolymer dispersion has a solids level of greater than 65 percent by weight, and a viscosity of less than 5000 mPa·s when measured at 55 percent solids at 25° C. Suitable polymerization initiators are said to include hydrogen peroxide, sodium persulfate, potassium persulfate, ammonium persulfate, and t-butyl hydroperoxide, which can be used alone or together with reducing agents such as sodium formaldehyde-sulfoxylate, iron-II-salts, sodium dithionite, sodium hydrogen sulfite, sodium sulfite, sodium thiosulfate, ascorbic acid, and erythorbic acid. In the Examples a redox couple comprising sodium formaldehyde sulfoxylate and t-butyl hydroperoxide is used. Spray drying of the resultant copolymer dispersion is said to produce a free flowing redispersible powder useful in floor screeds and ceramic tile adhesives.

SUMMARY

In one aspect, the invention resides in a vinyl ester/ethylene copolymer prepared by emulsion copolymerization of a monomer mixture comprising at least one vinyl ester, ethylene, a stabilizing system comprising polyvinyl alcohol and a free radical redox polymerization initiator system comprising t-butyl hydroperoxide as an oxidizing agent and at least one of a sulfinic acid-based compound and erythorbic acid or a salt thereof as a reducing agent, wherein said monomer mixture comprises from 55 wt % to 95 wt %, preferably 70 wt % to 95 wt %, of said at least one vinyl ester and from 5 wt % to 30 wt %, preferably 5 wt % to 15 wt %, of ethylene based on the total weight of monomers in said mixture and the copolymer has a formaldehyde content of less than 5.0 ppmw as determined by ISO-15173.

In one embodiment, the initiator system comprises erythorbic acid or a salt thereof as a reducing agent.

In another embodiment, the initiator system comprises a sulfinic acid-based compound as a reducing agent and especially a glycolic acid adduct of a sulfinic acid salt, such as 2-hydroxyphenyl hydroxymethyl sulfinic acid-sodium salt; 4-methoxyphenyl hydroxymethyl sulfinic acid-sodium salt; 2-hydroxy-2-sulfinato acetic acid-disodium salt; 2-hydroxy-2-sulfinato acetic acid-zinc salt; 2-hydroxy-2-sulfinato propionate-disodium salt; ethyl 2-hydroxy-2-sulfinato propionate-sodium salt and combinations thereof.

Typically, the polymerization initiator system further comprises a redox reaction catalyzing salt of a metal selected from iron, copper, manganese, silver, platinum, vanadium, nickel, chromium, palladium, and cobalt, with or without metal complexing agents.

In one embodiment, the stabilizing system further comprises at least one hydrolyzed polyvinyl alcohol having a degree of hydrolysis of from 75% to 100 mole %, preferably from 85% to 90 mole %.

Conveniently, the stabilizing system comprises a mixture of a first polyvinyl alcohol component having a Brookfield viscosity at 4% concentration in water at 25° C. of from 3 to 15 mPa·s, preferably from 3 to 10 mPa·s, and a second polyvinyl alcohol component having a Brookfield viscosity at 4% concentration in water at 25° C. of from 15 to 50 mPa·s, preferably from 20 to 36 mPa·s. In one embodiment, the stabilizing system comprises from 1 to 10 wt % of the first polyvinyl alcohol component based on the total weight of monomers in the monomer mixture and (b) from 0.1 to 5 wt % of the second polyvinyl alcohol component based on the total weight of monomers in the monomer mixture.

In some embodiments, the monomer mixture may further comprise up to 5 wt % of at least one cross-linking monomer and/or up to 10 wt % of at least one further monomer both based on the total weight of monomers in the monomer mixture.

In further aspects, the invention resides in a self-leveling flooring screed and a ceramic tile adhesive comprising the vinyl ester/ethylene copolymer described herein in redispersible particulate form.

DETAILED DESCRIPTION

Described herein is a vinyl ester/ethylene emulsion copolymer stabilized with at least one polyvinyl alcohol and produced using a free radical redox polymerization initiator system comprising t-butyl hydroperoxide as an oxidizing agent and at least one of a sulfinic acid-based compound and erythorbic acid or a salt thereof as a reducing agent. The copolymer has a formaldehyde content of less than 5.0 ppmw as determined by ISO-15173 and is particularly useful in self-leveling flooring screeds and ceramic tile adhesives.

Monomers

The principal, and in some cases the only, monomers employed in the present emulsion copolymer are at least one vinyl ester and ethylene.

The at least one vinyl ester is generally a vinyl ester(s) of a saturated carboxylic acid having 1 to 13, typically 2 to 10, carbon atoms, especially vinyl acetate. The vinyl ester component is typically present in the copolymer in an amount from about 55 wt % to about 95 wt based on the total weight of monomers in the monomer mixture used to produce the copolymer. More preferably, the vinyl ester is present in an amount from about 70 wt % to about 95 wt %, more preferably from about 85 wt % to about 95 wt %, of the total weight of monomers in the monomer mixture. The ethylene component is generally present in the copolymer in an amount from about 5 wt % to about 30 wt %, more preferably from about 5 wt % to about 15 wt %, of the total monomer weight.

Ethylene and vinyl ester(s) may be the only monomers used to produce the present copolymer, but is some embodiments the copolymer may contain up to 5 wt % of at least one cross-linking monomer based on the total weight of monomers in the monomer mixture. The preferred amount of the cross-linking monomer depends on type and mode of operation of the monomer. For example, one suitable type of cross-linking monomer has two or more double bonds which cross-link the copolymer during the polymerization. With this type of cross-linking monomer, the preferred amount of cross-linking monomer is 0 to 0.5 wt %, more preferably from 0.025 to 0.25 wt %, based on the total weight of monomers in the monomer mixture.

Examples of monomers of this kind containing two non-conjugated ethylenically unsaturated double bonds are alkylene glycol diacrylates and dimethacrylates, such as ethylene glycol diacrylate, 1,2-propylene glycoldiacrylate, 1,3-propylene glycol diacrylate, 1,3-butylene glycol diacrylate, 1,4-butylene glycol diacrylates or dimethylacrylates and ethylene glycol diacrylates or dimethacrylates, 1,2-propylene glycol dimethacrylate, 1,3-propylene glycol dimethacrylate, 1,3-butylene glycol dimethacrylate, 1,4-butylene glycol dimethacrylates, hexanediol diacrylate, pentaerythritol diacrylate, pentaerythritol diacrylate, and also divinylbenzene, vinyl methacrylate, vinyl acrylate, vinyl crotonate, allyl methacrylate, allyl acrylate, diallyl maleate, diallyl fumarate, diallyl phthalate, cyclopentadienyl acrylate, divinyl adipate or methylenebisacrylamide.

It is, however, also possible to use monomers having more than two double bonds, examples being tetraallyloxyethane, trimethylolpropane triacrylate, and triallyl cyanurate.

Another suitable type of cross-linking monomer is a monomer with one double bond and another reactive functionality which can cross-link later after the polymerization step. With this type of cross-linking monomer, the preferred amount of cross-linking monomer is 0 to 5 wt %, more preferably from 0.025 to 5 wt %, based on the total weight of monomers in the monomer mixture.

Examples of suitable ethylenically unsaturated monomers having at least one additional crosslinkable functional unit (d) are ethylenically unsaturated monomers containing N-alkylol groups and/or derivatives thereof, ethylenically unsaturated monomers containing hydrolyzable silane groups, ethylenically unsaturated monomers containing epoxy groups, and ethylenically unsaturated hydroxy-functional monomers.

Examples of ethylenically unsaturated monomers containing N-alkylol groups groups, are N-alkylol derivatives of amides of ethylenically unsaturated monocarboxylic or dicarboxylic acids, preferably of acrylic acid or of methacrylic acid. Preferred examples of such monomers are N-ethylolacrylamide, N-propylolacrylamide, N-butylolacrylamide or dialkoxyhydroxyethylacrylamide. In addition it is also possible to use derivatives of N-alkylol compounds, such as their esters, ethers or Mannich bases.

Examples of ethylenically unsaturated monomers containing hydrolyzable silane groups are ethylenically unsaturated monomers which have at least one alkoxysilyl group. Preferred are organosilanes of the formula:

$$R^1Si(CH_3)_{0-2}(OR^2)_{3-1},$$

in which $R^1$ has the meaning $CH_2=CR^3-(CH_2)_{0-1}$ or $CH_2=CR^3-CO_2-(CH_2)_{1-3}$;
$R^2$ is a straight-chain or branched chain, optionally substituted, alkyl radical having 1 to 12 carbon atoms, which may be optionally interrupted by an ether group, and $R^3$ is hydrogen or methyl.

Other preferred organosilanes have the formulae:

$$CH_2=CR^3-(CH_2)_{0-1}Si(CH_3)_{0-1}(OR^2)_{3-2} \text{ and}$$

$$CH_2=CR^3CO_2-(CH_2)_3Si(CH_3)_{0-1}(OR^2)_{3-2},$$

in which $R^{12}$ is a straight-chain or branched chain, optionally substituted, alkyl radical having 1 to 12 carbon atoms and $R^3$ is hydrogen or methyl.

Still other preferred organosilanes have the formulae:

$$CH_2=CR^3-(CH_2)_{0-1}Si(OR^4)_3 \text{ and}$$

$$CH_2=CR^3CO_2-(CH_2)_3Si(OR^4)_3,$$

in which $R^4$ is a branched or straight-chain alkyl radical having 1 to 4 carbon atoms and $R^3$ is hydrogen or methyl.

Examples of ethylenically unsaturated monomers containing epoxy groups are esters of ethylenically unsaturated monocarboxylic acids with 1,2-epoxyalkanols, preferably with 1,2-epoxypropanol. Very preferred are esters of acrylic acid and of methacrylic acid. Specific examples of preferred monomers of this type are glycidyl methacrylate and glycidyl acrylate.

In any event, cross-linking monomers which can decompose to produce formaldehyde, such as N-methylolacrylamide (NMA), should be avoided.

In addition to or in place of the cross-linking monomers discussed above, the present vinyl ester/ethylene copolymer may contain up to 10 wt %, preferably up to 5 wt %, more preferably up to 2 wt %, of at least one further ethylenically unsaturated monomer copolymerizable with vinyl esters and ethylene. One example of suitable further monomers are aliphatic, monoolefinically or diolefinically unsaturated hydrocarbons other than ethylene. Specific examples thereof are propene, 1-butene, 2-butene, isobutene, conjugated $C_4$-$C_8$ dienes, such as 1,3-butadiene and isoprene.

Other examples of suitable further monomers include are $\alpha,\beta$-monoethylenically unsaturated monocarboxylic and dicarboxylic acids having 3 to 10 carbon atoms, ethylenically unsaturated sulfonic acids, ethylenically unsaturated phosphonic acids, as well as their water-soluble salts, such as their sodium salts, or their anhydrides. Preferred monomers from this group are vinylsulfonic acid and its alkali metal salts, acrylamidopropanesulfonic acid and its alkali metal salts, ethylenically unsaturated $C_3$ to $C_8$ carboxylic acids and $C_4$ to $C_8$ dicarboxylic acids, such as maleic acid, fumaric acid, itaconic acid, crotonic acid, vinylacetic acid, acrylamidoglycolic acid, and, in particular, acrylic acid and methacrylic acid and the salts or anhydrides of these carboxylic acids.

An additional group of suitable further comonomers comprises esters of $\alpha,\beta$-ethylenically unsaturated monocarboxylic or dicarboxylic acids, especially esters of $\alpha,\beta$-ethylenically unsaturated $C_3$-$C_8$ monocarboxylic or dicarboxylic acids with preferably $C_1$-$C_{18}$ alkanols and especially $C_5$-$C_8$ alkanols or $C_5$-$C_8$ cycloalkanols. The esters of the dicarboxylic acids may be monoesters or, preferably, diesters. Suitable $C_1$-$C_8$ alkanols are, for example, methanol, ethanol, n-propanol, isopropanol, 1-butanol, 2-butanol, isobutanol, tert-butanol, n-hexanol, and 2-ethylhexanol. Suitable cycloalkanols are, for example, cyclopentanol or cyclohexanol. Examples are esters of acrylic acid, of methacrylic acid, of crotonic acid, of maleic acid, of itaconic acid, citraconic acid or of fumaric acid, such as methyl(meth)acrylate, ethyl(meth)acrylate, isopropyl(meth)acrylate, n-butyl(meth) acrylate, isobutyl(meth)acrylate, 1-hexyl(meth)acrylate, tert-butyl(meth)acrylate, 2-ethylhexyl(meth)acrylate, di-n-methyl maleate or fumarate, di-n-ethyl maleate or fumarate, di-n-propyl maleate or fumarate, di-n-butyl maleate or fumarate, diisobutyl maleate or fumarate, di-n-pentyl maleate or fumarate, di-n-hexyl maleate or fumarate, dicyclohexyl maleate or fumarate, di-n-heptyl maleate or fumarate, di-n-octyl maleate or fumarate, di(2-ethylhexyl) maleate or fumarate, di-n-nonyl maleate or fumarate, di-n-decyl maleate or fumarate, di-n-undecyl maleate or fumarate, dilauryl maleate or fumarate, dimyristyl maleate or fumarate, dipalmitoyl maleate, or fumarate, di-stearyl maleate or fumarate, and diphenyl maleate or fumarate.

Yet an additional group of suitable further comonomers include monomers with N-functional groups that are different from N-alkylol groups. These monomers e) include, for example, (meth)acrylamide, allylcarbamate, acrylamidoglycolic acid, acrylamidomethoxyacetic acid methyl ester, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl(meth)acrylamide, N-benzyl(meth)acrylamide, p-hydroxyphenyl(meth)-acrylamide, N-(3-hydroxy-2,2-dimethylpropyl)methacrylamide, ethylimidazolidone(meth) acrylate, N-(meth)acryloyloxyethylimidazolidin-1-one, N-(2-methacrylamido-ethyl)imidazolin-2-one, N-[(3-allyloxy-2-hydroxypropyl)aminoethyl]-imidazolin-2-one, N-vinylformamide, N-vinylpyrrolidone or N-vinylethyleneurea.

Emulsion Stabilizing System

The present emulsion copolymer includes a stabilizing system based on polyvinyl alcohol. Polyvinyl alcohols are frequently characterized by their degree of hydrolysis and the polyvinyl alcohol stabilizing system employed herein generally has a degree of hydrolysis of from 75% to 100 mole %, more preferably from 85% to 90 mole %. This can be achieved by the use of a single polyvinyl alcohol having the desired degree of hydrolysis or by a mixture of polyvinyl alcohols which have different degrees of hydrolysis but which, in admixture, provide the desired degree of hydrolysis.

Another important characteristic of a polyvinyl alcohol is its viscosity which is related to its molecular weight. In one preferred embodiment the polyvinyl alcohol stabilizing system employed herein comprises a mixture of a first polyvinyl alcohol component having a Brookfield viscosity at 4% concentration in water at 25° C. of from 3 to 15 mPa·s, more preferably from 3 to 10 mPa·s, and a second polyvinyl alcohol component having a Brookfield viscosity at 4% concentration in water at 25° C. of from 15 to 50 mPa·s, more preferably from 20 to 36 mPa·s. Generally, the stabilizing system comprises from 1 to 10 wt % of the first polyvinyl alcohol component based on the total weight of monomers in the monomer mixture and (b) from 0.1 to 5 wt % of the second polyvinyl alcohol component based on the total weight of monomers in the monomer mixture.

The polyvinyl alcohol may be included in the monomer mixture fed to the polymerization process and/or may be added after polymerization but before spray drying to produce the polymer powder Redox Initiator System The monomer mixture which is polymerized to produce the emulsion copolymer described herein also contains a specific free radical redox initiator system to facilitate the polymerization reaction. Such an initiator system comprises an oxidizing agent comprising t-butyl hydroperoxide, either alone or in combination with hydrogen peroxide, and a reducing agent comprising a sulfinic acid-based compound and/or erythorbic acid or a salt thereof.

Typically, the oxidizing agent is present in the monomer mixture in an amount from about 0.01% to about 1.0%, preferably from about 0.02% to about 0.5%, more preferably from about 0.025% to about 0.2%, by weight based on total weight of co-monomers.

Where the oxidizing agent comprises a mixture of t-butyl hydroperoxide and hydrogen peroxide, the t-butyl hydroperoxide is present in an amount between about 40% and about 60%, on an active basis, by weight of the oxidizing agent mixture.

Typically, the reducing agent is present in the monomer mixture in an amount from about 0.01% to about 1.0%, preferably from about 0.02% to about 0.5%, more preferably from about 0.025% to about 0.2%, by weight based on total weight of co-monomers.

Suitable sulfinic acid-based reducing agents include the glycolic acid adducts of sulfinic acid are suitable reducing agents for use herein, Specific examples of suitable sulfinic acid-based reducing agents include hydroxyphenyl hydroxymethyl sulfinic acid-sodium salt; 4-methoxyphenyl hydroxymethyl sulfinic acid-sodium salt; 2-hydroxy-2-sulfinato acetic acid-disodium salt; 2-hydroxy-2-sulfinato acetic acid-zinc salt; 2-hydroxy-2-sulfinato propionate-disodium salt; ethyl 2-hydroxy-2-sulfinato propionate-sodium salt and combinations of such reducing agents. A suitable erythorbic acid salt is sodium erythorbate.

The reducing agent can further comprise at least one sulfonic acid compound which corresponds to sulfinic acid-based compound(s) used, with or without the corresponding sulfite also being present as part of the reducing agent. An especially preferred reducing agent of this type comprises a combination of 2-hydroxy-2-sulfinato acetic acid-disodium salt and 2-hydroxy-2-sulfonato acetic acid-disodium salt, with or without sodium sulfite. Reducing agents of this type are commercially available under the tradenames Bruggolite® FF6 and FF7 from L. Brüggemann KG. Such reducing agents are more fully described in U.S. Pat. Nos. 6,211,400; 6,586,622 and 6,787,594, all of which patents are incorporated herein by reference.

Generally, the molar ratio of oxidizing agent to reducing agent in the redox initiator system is from 1.5:1 to 3:1, such as from 2:1 to 2.5:1.

The redox initiator systems used herein can also optionally comprise catalyzing metal salts of iron, copper, manganese, silver, platinum, vanadium, nickel, chromium, palladium, or cobalt. These catalyzing salts may be used at levels of from about 0.01 to about 25 ppm, with or without metal complexing agents. Preferably iron or copper may be used.

Polymerization Procedures and Conditions

The copolymer described herein can be prepared using any known emulsion polymerization procedure which a produces a copolymer dispersions in aqueous latex form. Such procedures are described in, for example, in U.S. Pat. No. 5,633,334, and in the *Encyclopedia of Polymer Science and Engineering*, Vol. 8, p. 659 ff (1987). The disclosures of both of these publications are incorporated herein by reference in their entirety.

The polymerization may be carried out in one, two or more stages with different monomer combinations, giving polymer dispersions having particles with homogeneous or heterogeneous, e.g., core shell or hemispheres, morphology. Any reactor system such as batch, loop, continuous, cascade, etc, may be employed.

The polymerization temperature generally ranges from about 20° C. to about 150° C., more preferably from about 50° C. to about 120° C. The polymerization generally takes place under pressure if appropriate, preferably from about 2 to about 150 bar, more preferably from about 5 to about 100 bar.

In a typical polymerization procedure involving, for example, vinyl acetate/ethylene copolymer dispersions, the vinyl acetate, ethylene, stabilizing system and other co-monomers can be polymerized in an aqueous medium under pressures up to about 120 bar in the presence the specified stabilizers and initiators. The aqueous reaction mixture in the polymerization vessel can be maintained by a suitable buffering agent at a pH of about 2 to about 7.

The manner of combining the several polymerization ingredients, i.e., stabilizing system, co-monomers, initiator system components, etc., can vary widely. Generally an aqueous medium containing at least part of the stabilizing system can be initially formed in a polymerization vessel with the various other polymerization ingredients being added to the vessel thereafter.

Co-monomers can be added to the polymerization vessel continuously, incrementally or as a single charge addition of the entire amounts of co-monomers to be used. Co-monomers can be employed as pure monomers or can be used in the form of a pre-mixed emulsion. Ethylene as a co-monomer can be pumped into the polymerization vessel and maintained under appropriate pressure therein.

It is possible for the total amount of redox initiator system to be included in the initial charge to the reactor at the beginning of the polymerization. Preferably, however, a portion of the initiator is included in the initial charge at the beginning, and the remainder is added after the polymerization has been initiated, in one or more steps or continuously. It is also possible to start the emulsion polymerization using a seed latex, for example comprising about 0.5 to about 15% by weight of the polymerization mixture.

On completion of the polymerization, a further, preferably chemical aftertreatment, especially with redox catalysts, for example combinations of the abovementioned oxidizing agents and reducing agents, may follow to reduce the level of residual unreacted monomer on the product. In addition, residual monomer can be removed in known manner, for example by physical demonomerization, i.e. distillative removal, especially by means of steam distillation, or by stripping with an inert gas. A particularly efficient combination is one of physical and chemical methods, which permits lowering of the residual monomers to very low contents (<1000 ppm, preferably <100 ppm).

Characteristics of the Copolymer Dispersion

The aqueous copolymer dispersions as prepared herein will generally have a Brookfield viscosity at 25° C. of from 100 to 10,000 mPa·s, as measured with a Brookfield viscometer at 20 rpm, with spindle 3. Preferably, the viscosity so measured will range from about 1000 to about 5,000 mPa·s. Viscosity may be adjusted by the addition of thickeners and/or water to the copolymer dispersion. Suitable thickeners can include polyacrylates or polyurethanes, such as Borchigel L75® and Tafigel PUR 60®. Alternatively, the copolymer dispersion may be substantially free of thickeners.

Following polymerization, the solids content of the resulting aqueous copolymer dispersions can be adjusted to the level desired by the addition of water or by the removal of water by distillation. Generally, the desired level of polymeric solids content after polymerization is from about 45 wt % to about 70 wt %, preferably from about 50 wt % to about 65 wt %, based on the total weight of the polymer dispersion. The polymeric solids in the dispersion will generally have an average particle size ranging from about 0.1 μm to about 5 μm. (Particle size can be measured using a Malvern Mastersizer.)

The aqueous copolymer dispersions herein will be very low in formaldehyde content and thus appropriate for formulation into consumer products. Formaldehyde content can be determined using Test Method ISO-15173 described in greater detail in the Test Methods section hereinafter.

The aqueous dispersions herein will generally have a formaldehyde content as determined using 150-15173 of less than about 10 ppm by weight, more preferably less than about 5 ppmw, and most preferably less than or equal to 1 ppmw.

Uses of the Copolymer Dispersion

The copolymer dispersion described herein can be formulated into a wide variety of coatings and adhesives for substrates such as paper, metals, plastics, paint surfaces, textiles, nonwovens and natural substances, such as wood.

In one embodiment, however, the dispersion is dried to produce a redispersible powder useful in a variety of construction applications, including self-leveling flooring screeds and ceramic tile adhesives. Drying is done by any means known in the art, such as freeze drying, drum drying, fluidized bed, or spray drying. Spray drying is preferred and may involve mixing additional polyvinyl alcohol to the dispersion to assist in the spray drying. The resultant redispersible powder may them be combined with one or more inorganic binders and extenders. Suitable binders include gypsum and cement, while suitable extenders include from calcium and magnesium carbonates, silicates, cellulose, calcium oxide, other minerals, and mixtures thereof.

The invention will now be more particularly described with reference to the following non-limiting Examples.

COPOLYMER PREPARATION EXAMPLES

In these Examples, solids content was measured by drying 1 to 2 g of the aqueous dispersion at 105° C. for 4 hours, then dividing the weight of dried polymer by the weight of dispersion.

Viscosity was determined at 25° C. using a Brookfield DV-I+ Viscometer, spindle 3 or spindle 4, at a speed of 20 rpm.

Grit was determined by filtering 100 g of dispersion through a 40μ filter, drying and weighing the dried grit. This is expressed as a % on the wet dispersion. When the viscosity of the dispersion was high, it was first diluted with 100 g of water.

Glass Transition Temperature, (Tg), was determined according to ASTM E 1356 by Differential Scanning Calorimetry, (DSC), using a Mettler DSC 820 with a fluid $N_2$ cooling system. The tested range was from −80° C. to 130° C. with a heating rate of 10° C./min. The onset of the Tg is quoted.

The formaldehyde content was determined according to ISO 15173 for measuring the free formaldehyde in polymer dispersions. The aqueous phase was separated by centrifugation, then the free formaldehyde was complexed by reacting with acetyl acetone, (Nash reagent), then the complex was analyzed by HPLC with a UV detector.

Example 1 (Comparative)

Preparation of a Vinyl Acetate/Ethylene copolymer with a weight ratio of VA/E of 90/10, stabilized by 3.0 pphm Celvol E 4/88+1.5 pphm of Celvol 523, polymerized using a redox couple of hydrogen peroxide and sodium erythorbate.

An aqueous solution was prepared by the addition of 786.9 g of a 25% aqueous solution of polyvinyl alcohol, having a hydrolysis degree of 87-89% and a Hoppler viscosity at 4% concentration of 4.0 to 5.0 mPa·s at 25° C., (Celvol E 4/88), 655.8 g of a 15% aqueous solution of polyvinyl alcohol, having a hydrolysis degree of 87-89% and a Hoppler viscosity at 4% concentration 23 to 27 mPa·s at 25° C., (Celvol 523), 1.04 g of sodium erythorbate and 1.73 g of a defoamer, (Agitan 282), to 2360.8 g of deionised water whilst stirring. 1.9 g of a 4% active solution of ferric chloride was added, then the pH was adjusted to pH 4.2 by the use of phosphoric acid. The aqueous solution was then charged to a 10-liter pressure reactor equipped with a stirrer, dosage pumps and a mass flow meter for dosing ethylene. The reactor was degassed by twice evacuating, then pressurising with nitrogen to 2 bar, then finally evacuating. The stirrer was set to 150 rpm.

The reactor was heated to 36° C. and 1875.5 g of vinyl acetate was pumped into the reactor, with the stirrer being increased to 600 rpm when 50% of the vinyl acetate had been added. Then 546.5 g of ethylene was metered into the reactor.

When the reactor temperature stabilized at 36° C., addition of a reducer solution comprising 8.91 g of sodium erythorbate and 2.73 g of sodium bicarbonate in 184.7 g of deionized water was commenced at a dosage rate of 39.3 g/hour and addition of an oxidiser solution comprising 12.75 g of 30% active hydrogen peroxide dissolved in 375.4 g of deionised water was commenced at a dosage rate of 77.6 g/hour. After detection of a temperature increase of 2° C., the jacket temperature was increased so that the internal reactor temperature increased to 85° C. in 30 minutes. When the internal reactor temperature reached 40° C., the slow addition of a further 3042.8 g of vinyl acetate commenced over 105 minutes.

The jacket temperature was allowed to vary to keep the internal temperature at 85° C. After the addition of vinyl acetate was complete, the redox additions were maintained at 39.3 g/hour for the reducer and 77.6 g/hour for the oxidizer until the exotherm began to die. When the jacket temperature increased to 70° C., the redox addition rates were quadrupled, and the internal temperature kept at 85° C. by allowing the jacket temperature to increase. After all additions were complete, the reactor was kept at 85° C. for a further 15 minutes to allow completion of the main polymerization.

The reaction mixture was then cooled to 55° C. and transferred to a stripping vessel equipped with a stirrer, (operating at 200 rpm), and vacuum. When 50% of the reaction mixture had been transferred, a solution comprising 2.51 g of sodium erythorbate, 0.82 g of sodium bicarbonate, and 0.38 g of defoamer, (Agitan 282), in 142.1 g of deionised water was added. Once all of the reactor contents were transferred a solution comprising 1.25 g of 70% active t-butylhydroperoxide and 2.91 g of 30% active hydrogen peroxide in 142.1 g of deionised water was added, and the stripper was kept at 50° C. for 30 minutes. The stripper contents were cooled to 20° C. and discharged. The resultant dispersion was filtered through a 180μ mesh.

The resultant dispersion had a solids content of 55.9%, viscosity of 2950 mPa·s, pH of 4.8, grit, (measured on a 40μ mesh), of 0.03%, a Tg, (onset, by DSC), of 17.5° C., and a formaldehyde content by HPLC of 0.1 ppm.

Example 2

Preparation of a Vinyl Acetate/Ethylene copolymer with a weight ratio of VA/E of 90/10, stabilized by 3.0 pphm Celvol E 4/88+1.5 pphm of Celvol 523, polymerized using a redox couple of t-butyl hydroperoxide and sodium erythorbate.

An aqueous solution was prepared by the addition of 787.9 g of a 25% aqueous solution of polyvinylalcohol, having a hydrolysis degree of 87-89% and a Hoppler viscosity at 4% concentration of 4.0 to 5.0 mPa·s at 25° C., (Celvol E 4/88), 656.6 g of a 15% aqueous solution of polyvinylalcohol, having a hydrolysis degree of 87-89% and a Hoppler viscosity at 4% concentration 23 to 27 mPa·s at 25° C., (Celvol 523), 0.45 g of sodium erythorbate and 1.73 g of a defoamer, (Agitan 282), to 2360.8 g of deionised water whilst stirring. 1.9 g of a 4% active solution of ferric chloride was added, then the pH was adjusted to pH 4.2 by the use of phosphoric acid. Then the aqueous solution was charged to a 10-liter pressure reactor equipped with a stirrer, dosage pumps and a mass flow meter for dosing ethylene. The reactor was degassed by twice evacuating, then pressurizing with nitrogen to 2 bar, then finally evacuating. The stirrer was set to 150 rpm.

The reactor was heated to 36° C. and 1877.9 g of vinyl acetate was pumped into the reactor. When 50% of the vinyl acetate had been added, the stirrer speed was increased to 600 rpm and then 547.2 g of ethylene was metered to the reactor.

When the reactor temperature stabilized at 36° C., addition of a reducer solution comprising 3.67 g of sodium erythorbate and 2.74 g of sodium bicarbonate in 185.0 g of deionized water was commenced at a dosage rate of 38.3 g/hour and addition of an oxidiser solution comprising 5.94 g of 70% active t-butyl hydroperoxide dissolved in 375.9 g of deionised water was commenced at a dosage rate of 76.4 g/hour. After detection of a temperature increase of 2° C., the jacket temperature was increased so that the internal reactor temperature increased to 85° C. in 30 minutes. When the internal reactor temperature reached 40° C., the slow addition of a further 3046.7 g of vinyl acetate commenced over 105 minutes.

The jacket temperature was allowed to vary to keep the internal temperature at 85° C. After the addition of vinyl acetate was complete, the redox additions were maintained at 38.3 g/hour for the reducer and 76.4 g/hour for the oxidizer until the exotherm began to die. When the jacket temperature increased to 70° C., the redox addition rates were quadrupled, and the internal temperature kept at 85° C. by allowing the jacket temperature to increase. After all additions were complete, the reactor was kept at 85° C. for a further 15 minutes to allow completion of the main polymerization.

The reaction mixture was then cooled to 55° C. and transferred to a stripping vessel equipped with a stirrer, (operating at 200 rpm), and vacuum. When 50% of the reaction mixture had been transferred, a solution comprising 2.52 g of sodium erythorbate, 0.82 g of sodium bicarbonate, and 0.38 g of defoamer, (Agitan 282), in 142.3 g of deionised water, were added. Once all of the reactor contents were transferred a solution comprising 1.25 g of 70% active t-butylhydroperoxide and 2.92 g of 30% active hydrogen peroxide in 142.1 g of deionised water was added, and the stripper was kept at 50° C. for 30 minutes. The stripper contents were cooled to 20° C. and discharged. The resultant dispersion was filtered through a 180µ mesh.

The resultant dispersion had a solids content of 56.4%, viscosity of 4080 mPa·s, pH of 5.3, grit, (measured on a 40µ mesh), of 0.005%, a Tg, (onset, by DSC), of 16.7° C., and a formaldehyde content by HPLC of 0.1 ppm.

Example 2A

Example 2 was repeated and the resultant dispersion had a solids content of 56.2%, viscosity of 3815 mPa·s, pH of 5.4, grit, (measured on a 40µ mesh), of 0.007%, a Tg, (onset, by DSC), of 16.1° C., and a formaldehyde content by HPLC of 0.1 ppm.

Example 3

The procedure of Example 2 was followed except that the levels of t-butyl hydroperoxide and sodium erythorbate used in the main polymerization in the reactor were reduced by 25%. The weight of sodium erythorbate added to the initial reactor charge was reduced from 0.45 g to 0.33 g, the weight of sodium erythorbate in the continuously added reducer solution was reduced from 3.67 g to 2.74 g and the weight of t-butylhydroperoxide in the continuously added oxidizer solution was reduced from 5.94 g to 4.46 g.

The resultant dispersion had a solids content of 56.6%, viscosity of 5680 mPa·s, pH of 5.2, grit, (measured on a 40µ mesh), of 0.004%, a Tg, (onset, by DSC), of 16.5° C., and a formaldehyde content by HPLC of 0.1 ppm.

Example 3A

Example 3 was repeated and the resultant dispersion had a solids content of 56.4%, viscosity of 6070 mPa·s, pH of 5.3, grit, (measured on a 40µ mesh), of 0.027%, a Tg, (onset, by DSC), of 15.5° C., and a formaldehyde content by HPLC of 0.1 ppm.

Example 4

The procedure of example 2 was followed except that the levels of hydrogen peroxide, t-butyl hydroperoxide and sodium erythorbate added in the stripper were reduced by 50%.

The resultant dispersion had a solids content of 56.7%, viscosity of 4260 mPa·s, pH of 4.8, grit, (measured on a 40µ mesh), of 0.005%, a Tg, (onset, by DSC), of 15.9° C., and a formaldehyde content by HPLC of 0.1 ppm.

Example 4A

Example 4 was repeated and the resultant dispersion had a solids content of 56.5%, viscosity of 3965 mPa·s, pH of 5.4, grit, (measured on a 40µ mesh), of 0.009%, a Tg, (onset, by DSC), of 16.0° C., and a formaldehyde content by HPLC of 0.1 ppm.

Example 5

Example 5 used a mixture of hydrogen peroxide and t-butylhydroperoxide as oxidizer with sodium erythorbate as reducer, using 50% of the level of hydrogen peroxide in Example 1 plus 50% of the level of t-butylhydroperoxide in Example 2, with the level of sodium erythorbate equal to 50% of that in Example 1+50% of that in Example 2. The weight of sodium erythorbate added to the initial reactor charge was 0.75 g and the weight of sodium erythorbate in the continuously added reducer solution was 6.29 g. The weight of hydrogen peroxide in the continuously added oxidizer solution was 6.38 g while the weight of t-butylhydroperoxide in the continuously added oxidizer solution was 2.97 g. Additionally, the oxidizer solution used in the stripper comprised 2.5 g of t-butylhydroperoxide dissolved in 142.2 g of water.

The resultant dispersion had a solids content of 55.2%, viscosity of 2160 mPa·s, pH of 5.3, grit, (measured on a 40µ mesh), of 0.004%, a Tg, (onset, by DSC), of 17.1° C., and a formaldehyde content by HPLC of 0.1 ppm.

Discussion of Examples 1 to 5

In Example 1, the amount of redox initiators used in the main polymerization corresponded to 2.071 mmoles of active hydrogen peroxide per 100 g of monomer, 0.928 mmoles of sodium erythorbate per 100 g of monomer and a molar ratio of hydrogen peroxide to sodium erythorbate of 2.23 to 1.

In Example 2, the amount of redox initiators used in the main polymerization corresponded to 0.844 mmoles of active t-butylhydroperoxide per 100 g of monomer, 0.379 mmoles of sodium erythorbate per 100 g of monomer and a molar ratio of t-butylhydroperoxide to sodium erythorbate of 2.23 to 1.

In Example 3, the amount of redox initiators used in the main polymerization corresponded to 0.663 mmoles of active t-butylhydroperoxide per 100 g of monomer, 0.283 mmoles of sodium erythorbate per 100 g of monomer and a molar ratio of t-butylhydroperoxide to sodium erythorbate of 2.34 to 1.

In Example 4, the amount of redox initiators used in the main polymerization was the same as for Example 2. The amount of redox initiators was reduced for the post-treatment.

In Example 5, the amount of redox initiators used in the main polymerization corresponded to 1.029 mmoles of active hydrogen peroxide per 100 g of monomer, 0.422 mmoles of t-butylhydroperoxide per 100 g of monomer and 0.652 mmoles of sodium erythorbate per 100 g of monomer. The molar ratio of oxidiser to sodium erythorbate was 2.23 to 1, while the molar ratio of hydrogen peroxide to sodium erythorbate was 1.58 to 1.

The residual vinyl acetate monomer (VAM) levels before transfer to the stripper vessel and after all post-reaction in the stripper vessel are given in Table 1 below.

TABLE 1

| | Oxidiser Level, (mmol/100 g monomer) | Reducer Level, (mmol/100 g monomer) | VAM before transfer, (ppm) | VAM after post-treatment, (ppm) |
|---|---|---|---|---|
| Example 1 | 2.071 | 0.928 | 17173 | 4394 |
| Example 2 | 0.844 | 0.379 | 570 | 246 |
| Example 3 | 0.663 | 0.283 | 1112 | 727 |
| Example 4 | 0.844 | 0.379 | 556 | 175 |
| Example 5 | 1.452 | 0.652 | 2316 | 1036 |

Thus it can clearly be seen by comparing Examples 2 to 4 with Example 1 that the redox couple of t-butylhydroperoxide and sodium erythorbate is much more effective for the polymerization than the redox couple of hydrogen peroxide with sodium erythorbate, as significantly higher conversion is achieved with much lower levels, (on a molar basis), of the redox components. Also, in Example 5, replacing 50% of the hydrogen peroxide by a much lower level of t-butylhydroperoxide, (on a molar basis), also improved the conversion.

Example 6

The procedure of Example 2 was followed except that sodium erythorbate was replaced by Brüggolite FF6. The weight of Brüggolite FF6 added to the initial reactor charge was 0.60 g, the weight of Brüggolite FF6 in the continuously added reducer solution was 4.87 g and the weight of Brüggolite FF6 in the stripper addition was 1.09 g.

The resultant dispersion had a solids content of 56.4%, viscosity of 4230 mPa·s, pH of 5.7, grit, (measured on a 40μ mesh), of 0.019%, a Tg, (onset, by DSC), of 16.7° C., a residual VAM content of 444 ppm, and a formaldehyde content by HPLC that was non-detectable.

Example 7

The procedure of Example 6 was followed except that the levels of t-butyl hydroperoxide and Brüggolite FF6 used in the main polymerization in the reactor were reduced by 25% and 33% respectively. The weight of Brüggolite FF6 added to the initial reactor charge was reduced from 0.60 g to 0.38 g, the weight of Brüggolite FF6 in the continuously added reducer solution was reduced from 4.87 g to 3.28 g and the weight of t-butylhydroperoxide in the continuously added oxidizer solution was reduced from 5.94 g to 4.46 g.

The resultant dispersion had a solids content of 56.5%, viscosity of 5920 mPa·s, pH of 5.4, grit, (measured on a 40μ mesh), of 0.002%, a Tg, (onset, by DSC), of 17.1° C., a residual VAM content of 974 ppm, and a formaldehyde content by HPLC that was non-detectable.

Example 8 (Comparative)

Preparation of a Vinyl Acetate/Ethylene copolymer with a weight ratio of VA/E of 88/12, stabilized by 5.4 pphm Celvol E 4/88, polymerized using a redox couple of hydrogen peroxide and sodium formaldehyde sulphoxylate.

An aqueous solution was prepared by the addition of 1248.4 g of a 25% aqueous solution of polyvinylalcohol, having a hydrolysis degree of 87-89% and a Hoppler viscosity at 4% concentration of 4.0 to 5.0 mPa·s at 25° C., (Celvol E 4/88 LA), 0.87 g of Brüggolite E01, (sodium formaldehyde sulphoxylate) and 1.83 g of a defoamer, (Agitan 282), to 2207.8 g of deionised water whilst stirring. 2.0 g of a 4% active solution of ferric chloride was added, then the pH was adjusted to pH 3.6 by the use of phosphoric acid. Then the aqueous solution was charged to a 10-liter pressure reactor equipped with a stirrer, dosage pumps and a mass flow meter for dosing ethylene. The reactor was degassed by twice evacuating, then pressurizing with nitrogen to 2 bar, then finally evacuating. The stirrer was set to 150 rpm.

The reactor was heated to 36° C. and 1983.6 g of vinyl acetate was pumped into the reactor. When 50% of the vinyl acetate had been added, the stirrer speed was increased to 600 rpm and then 693.6 g of ethylene was metered to the reactor.

When the reactor temperature and pressure stabilized at 36° C., addition of a reducer solution comprising 6.65 g of sodium formaldehyde sulphoxylate and 2.89 g of sodium bicarbonate in 195.4 g of deionized water was commenced at a dosage rate of 40.0 g/hour and addition of an oxidiser solution comprising 12.3 g of 30% active hydrogen peroxide dissolved in 397.1 g of deionised water was commenced at a dosage rate of 81.0 g/hour. After detection of a temperature increase of 2° C., the jacket temperature was increased so that the internal reactor temperature increased to 85° C. in 30 minutes. When the internal reactor temperature reached 40° C., the slow addition of a further 3102.5 g of vinyl acetate commenced over 105 minutes.

The jacket temperature was allowed to vary to keep the internal temperature at 85° C. After the addition of vinyl acetate was complete, the redox additions were maintained at 40.0 g/hour for the reducer and 81.0 g/hour for the oxidizer until the exotherm began to die. When the jacket temperature increased to 70° C., the redox addition rates were quadrupled, and the internal temperature kept at 85° C. by allowing the jacket temperature to increase.

After all additions were complete, the reactor was kept at 85° C. for a further 15 minutes. The reaction mixture was then cooled to 55° C. and transferred to a stripping vessel equipped with a stirrer, (operating at 200 rpm), and vacuum. When 50% had been transferred, a solution comprising 2.08 g of sodium formaldehyde sulphoxylate, 0.87 g of sodium bicarbonate, and 0.40 g of defoamer, (Agitan 282), in 150.3 g of deionised water was added. Once all of the reactor contents were transferred a solution comprising 1.32 g of 70% active t-butylhydroperoxide and 3.08 g of 30% active hydrogen peroxide in 150.3 g of deionised water was added, and the stripper was kept at 50° C. for 30 minutes. The stripper contents were cooled to 20° C. and discharged. The resultant dispersion was filtered through a 180μ mesh.

The resultant dispersion had a solids content of 59.2%, viscosity of 1590 mPa·s, pH of 4.7, grit, (measured on a 40μ mesh), of 0.004%, a Tg, (onset, by DSC), of 13.4° C., a residual VAM content of 1664 ppm and a formaldehyde content by HPLC of 78 ppm.

APPLICATIONS TESTING EXAMPLES

In these Examples, flow testing of certain floor screed formulations was conducted in a steel mould with an internal diameter of 30 mm and a height of 50 mm placed on a glass plate. The mould was filled with freshly prepared screed or screed that had been aged for 20 minutes. The mould was then raised to a height of 10 cm and the screed allowed to flow. After the screed had finished flowing, the diameter of the space occupied by the screed on the glass plate was measured in two directions perpendicular to each other and the average value calculated.

To test the bond strength of the floor screed formulations, square shaped moulds with sides of 50 mm length, and a height of 5 mm were placed on a concrete slab and filled with fresh screed. The moulds were removed after 24 hours, then the samples were cured for 7 days or 28 days. The bonding strength was then measured using an LBY tensiometer, (supplied by the China Building Material Test & Certification Centre), with the force increasing at 250N/s±50N/s. The measurement was repeated 5 times and the average taken.

Compressive and flexural strength tests were performed according to the standard GB/T 17671. Rectangular moulds 160 mm in length and 40 mm in width and height were filled with screed. After 24 hours the moulds were removed and the rectangular test pieces were cured for 1 day or 28 days. The compressive strength was measured using a ToniPRAX tensiometer, (supplied by Toni Technik), with the force increasing at 2400N/s±200N/s. The measurement was repeated 6 times and the average taken. Flexural strength was also measured using a ToniPRAX tensiometer. The measurement was repeated 3 times and the average taken.

Example 9

The copolymer dispersions of Examples 1 to 5 were employed to produce floor screed formulations having the compositions summarized in Table 2.

TABLE 2

| Ordinary Portland Cement, (42.5 mesh) | 37% |
| Silica Sand, (70-140 mesh) | 43.2-44.7% |
| Limestone, (325 mesh) | 16.5% |
| Superplasticiser F10 | 0.6% |
| Cellulosic Thickener, (Tylose MH300P2) | 0.08% |
| Defoamer, (Silipon 2971) | 0.15% |
| Polymer solids of Examples 1 to 5 | 1/1.5/2.0/2.5% |
| Water to powder, (including dispersion water) | 21% |

A sufficient quantity of ingredients was weighed out to make sufficient screed for all the required testing. The dry ingredients were mixed using a V-blender for 20 minutes to make a homogeneous mixture. Water was weighed out and liquid ingredients added and mixed. Then the homogeneous mixture of dry ingredients was added to the water and mixed using a mortar mixer for 1 minute at low speed. The mixer was stopped and the stirrer cleaned within 30 seconds. Then the mixture was stirred for 1 minute at high speed. The stirrer was stopped and the mixture was allowed to mature for 5 minutes. Then the mixture was stirred for a further 1 minute at high speed to produce a screed ready for subsequent testing.

The results obtained on testing the screeds are summarized in Table 3.

TABLE 3

| | | Flexural Strength, (Mpa.) | | Compressive Strength, (Mpa.) | | Bonding Strength, (Mpa.) | | Flow, (mm) | |
|---|---|---|---|---|---|---|---|---|---|
| Sample | Level (%) | 1 d | 28 d | 1 d | 28 d | 7 d | 28 d | 0 min | 20 min |
| Example 1 | 1.0 | 3.99 | 11.10 | 15.25 | 47.43 | 1.11 | 1.18 | 124 | 118 |
| | 1.5 | 2.83 | 7.34 | 9.28 | 40.05 | 1.40 | 1.56 | 123 | 116 |
| | 2.0 | 1.65 | 11.91 | 5.15 | 48.22 | 1.23 | 1.77 | 106 | 103 |
| | 2.5 | 1.38 | 10.08 | 4.37 | 41.50 | 1.79 | 1.83 | 130 | 130 |
| Example 2 | 1.0 | 3.86 | 10.64 | 14.02 | 46.42 | 1.16 | 1.13 | 126 | 117 |
| | 1.5 | 2.93 | 10.29 | 9.15 | 40.28 | 1.54 | 1.55 | 127 | 121 |
| | 2.0 | 3.46 | 11.50 | 11.80 | 47.47 | 1.78 | 1.71 | 121 | 114 |
| | 2.5 | 1.33 | 9.79 | 4.22 | 41.95 | 1.77 | 1.89 | 131 | 132 |
| Example 3 | 1.0 | 3.40 | 10.37 | 10.73 | 44.28 | 0.77 | 1.05 | 124 | 119 |
| | 1.5 | 3.68 | 11.11 | 13.70 | 42.75 | 0.95 | 1.66 | 119 | 115 |
| | 2.0 | 3.84 | 11.99 | 28.83 | 48.68 | 1.64 | 1.42 | 128 | 125 |
| | 2.5 | 0.85 | 10.61 | 2.51 | 41.47 | 1.75 | 1.54 | 133 | 133 |
| Example 4 | 1.0 | 2.52 | 7.97 | 9.35 | 35.98 | 1.23 | 1.27 | 115 | 116 |
| | 1.5 | 3.99 | 11.73 | 14.08 | 47.13 | 1.22 | 1.33 | 124 | 118 |
| | 2.0 | 2.30 | 11.77 | 7.13 | 47.20 | 1.30 | 1.77 | 115 | 114 |
| | 2.5 | 0.72 | 9.42 | 2.05 | 41.33 | 1.79 | 1.87 | 132 | 132 |
| Example 5 | 1.0 | 3.29 | 11.03 | 11.58 | 45.17 | 0.99 | 1.01 | 126 | 116 |
| | 1.5 | 2.62 | 10.46 | 10.48 | 41.72 | 1.19 | 1.24 | 118 | 113 |
| | 2.0 | 4.98 | 9.67 | 27.40 | 45.22 | 1.59 | 1.67 | 113 | 109 |
| | 2.5 | 0.76 | 9.75 | 2.02 | 40.40 | 1.81 | 1.93 | 134 | 134 |

Comparison of the screeds produced from the copolymer dispersions of Examples 2 to 5 with those produced from the copolymer dispersion of Example 1 shows that a redox couple of t-butylhydroperoxide with sodium erythorbate or a mixture of hydrogen peroxide and t-butylhydroperoxide with sodium erythorbate can give similar performance in terms of flexural strength, compressive strength and bonding, and equivalent or better flow to a redox couple of hydrogen peroxide with sodium erythorbate, with lower VOC's and using lower initiator levels.

Example 10

Further floor screed formulations were produced having compositions similar to those summarized in Table 2 but employing the copolymer dispersions of Examples 2A, 3A and 4A and Examples 6 to 8. The results obtained on testing these further screeds are summarized in Table 4.

TABLE 4

| | | Flexural Strength, (Mpa.) | | Compressive Strength, (Mpa.) | | Bonding Strength, (Mpa.) | | Flow, (mm) | |
|---|---|---|---|---|---|---|---|---|---|
| Sample | Level (%) | 1 d | 28 d | 1 d | 28 d | 7 d | 28 d | 0 min | 20 min |
| Example 2A | 1.0 | 0.73 | 9.62 | 2.00 | 40.93 | 1.14 | 1.29 | 130 | 130 |
| | 1.5 | 0.33 | 9.41 | na | 38.30 | 1.28 | 1.34 | 128 | 131 |
| | 2.0 | 0.93 | 8.65 | 3.47 | 38.68 | 1.56 | 1.45 | 130 | 131 |
| | 2.5 | 1.91 | 9.86 | 6.57 | 40.25 | 1.73 | 2.04 | 119 | 118 |
| Example 3A | 1.0 | na | 9.40 | na | 38.37 | 1.32 | 1.42 | 133 | 132 |
| | 1.5 | 0.63 | 8.56 | 2.15 | 40.02 | 1.41 | 1.47 | 99 | 102 |
| | 2.0 | 0.60 | 9.73 | 2.17 | 42.10 | 1.82 | 1.71 | 132 | 130 |

TABLE 4-continued

| Sample | Level (%) | Flexural Strength, (Mpa.) | | Compressive Strength, (Mpa.) | | Bonding Strength, (Mpa.) | | Flow, (mm) | |
|---|---|---|---|---|---|---|---|---|---|
| | | 1 d | 28 d | 1 d | 28 d | 7 d | 28 d | 0 min | 20 min |
| | 2.5 | 1.78 | 9.97 | 6.20 | 40.55 | 1.76 | 2.04 | 118 | 118 |
| Example 4A | 1.0 | 1.42 | 9.97 | 4.73 | 40.93 | 1.09 | 1.15 | 132 | 132 |
| | 1.5 | 0.86 | 9.39 | 2.52 | 38.42 | 1.23 | 1.37 | 130 | 130 |
| | 2.0 | 0.41 | 9.17 | na | 40.87 | 1.42 | 1.52 | 133 | 132 |
| | 2.5 | 1.84 | 9.70 | 6.37 | 39.05 | 1.61 | 2.01 | 121 | 119 |
| Example 6 | 1.0 | 0.54 | 10.08 | 1.61 | 38.52 | 0.88 | 1.17 | 130 | 129 |
| | 1.5 | 0.71 | 9.56 | 2.00 | 37.87 | 1.29 | 1.61 | 135 | 134 |
| | 2.0 | 0.57 | 8.50 | 1.62 | 40.42 | 1.52 | 1.57 | 130 | 129 |
| | 2.5 | 1.27 | 8.87 | 6.08 | 40.92 | 1.45 | 1.94 | 127 | 119 |
| Example 7 | 1.0 | 0.47 | 10.24 | na | 42.87 | 0.94 | 1.19 | 132 | 130 |
| | 1.5 | 0.59 | 9.52 | 1.90 | 39.22 | 1.34 | 1.59 | 133 | 135 |
| | 2.0 | 0.51 | 9.53 | 1.97 | 42.32 | 1.63 | 1.69 | 133 | 130 |
| | 2.5 | 1.65 | 8.78 | 6.28 | 37.50 | 1.57 | 2.08 | 120 | 116 |
| Example 8 | 1.0 | 1.50 | 8.45 | 5.02 | 36.55 | 0.68 | 0.80 | 125 | 124 |
| | 1.5 | 0.95 | 9.16 | 3.40 | 42.23 | 0.87 | 0.93 | 130 | 130 |
| | 2.0 | 1.04 | 8.41 | 3.77 | 37.82 | 0.85 | 1.16 | 135 | 136 |
| | 2.5 | 0.70 | 9.05 | 2.37 | 45.37 | 1.16 | 1.30 | 120 | 120 |

Comparison of the screeds produced from the copolymer dispersions of Examples 6 and 7 with those produced from the copolymer dispersions of Examples 2A to 4A, shows that similar performance in terms of flexural strength, compressive strength, bonding and flow can be obtained using a sulfinic acid based reducing agent in combination with t-butyl hydroperoxide as can be obtained using sodium erythorbate as the reducing agent.

Comparison of the screeds produced from the copolymer dispersions of Examples 2A to 4A, 6 and 7, containing a higher molecular weight polyvinyl alcohol, with those produced from the copolymer dispersion of Example 8, containing only a low molecular weight polyvinyl alcohol, shows that similar performance in terms of flexural strength, compressive strength and flow can be obtained, but with a higher bond strength.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A vinyl ester/ethylene copolymer prepared by emulsion copolymerization of a monomer mixture comprising at least one vinyl ester, ethylene, a stabilizing system comprising polyvinyl alcohol and a free radical redox polymerization initiator system comprising t-butyl hydroperoxide as an oxidizing agent and at least one of a sulfinic acid-based compound as a reducing agent, wherein said monomer mixture comprises from 70 wt % to 95 wt % of said at least one vinyl ester and from 5 wt % to 30 wt % of ethylene based on the total weight of monomers in said mixture and the copolymer has a formaldehyde content of less than 5.0 ppmw as determined by ISO-15173.

2. The copolymer according to claim 1, wherein monomer mixture comprises from 5 wt % to 15 wt % of ethylene based on the total weight of monomers in said mixture.

3. The copolymer according to claim 1, wherein the sulfinic acid-based reducing agent is a glycolic acid adduct of a sulfinic acid salt.

4. The copolymer according to claim 1, wherein the sulfinic acid-based reducing agent is a sulfinic acid-based compound selected from 2-hydroxyphenyl hydroxymethyl sulfinic acid-sodium salt; 4-methoxyphenyl hydroxymethyl sulfinic acid-sodium salt; 2-hydroxy-2-sulfinato acetic acid-disodium salt; 2-hydroxy-2-sulfinato acetic acid-zinc salt; 2-hydroxy-2-sulfinato propionate-disodium salt; ethyl 2-hydroxy-2-sulfinato propionate-sodium salt and combinations of said reducing agents.

5. The copolymer according to claim 1, wherein said initiator system comprises a mixture of t-butyl hydroperoxide and hydrogen peroxide as an oxidizing agent.

6. The copolymer according to claim 1, wherein the polymerization initiator system further comprises a redox reaction catalyzing salt of a metal selected from iron, copper, manganese, silver, platinum, vanadium, nickel, chromium, palladium, and cobalt, with or without metal complexing agents.

7. The copolymer according to claim 1, wherein the stabilizing system further comprises at least one polyvinyl alcohol having a degree of hydrolysis of from 75% to 100 mole %.

8. The copolymer according to claim 1, wherein the stabilizing system further comprises at least one polyvinyl alcohol having a degree of hydrolysis of from 85% to 90 mole %.

9. The copolymer according to claim 1, wherein the stabilizing system comprises a mixture of a first polyvinyl alcohol component having a Brookfield viscosity at 4% concentration in water at 25° C. of from 3 to 15 mPa·s and a second polyvinyl alcohol component having a Brookfield viscosity at 4% concentration in water at 25° C. of from 15 to 50 mPa·s.

10. The copolymer according to claim 1, wherein the stabilizing system comprises a mixture of a first polyvinyl alcohol component having a Brookfield viscosity at 4% concentration in water at 25° C. of from 3 to 10 mPa·s and a second polyvinyl alcohol component having a Brookfield viscosity at 4% concentration in water at 25° C. of from 20 to 36 mPa·s.

11. The copolymer according to claim 9, wherein the stabilizing system comprises from 1 to 10 wt % of the first polyvinyl alcohol component based on the total weight of monomers in the monomer mixture and (b) from 0.1 to 5 wt % of the second polyvinyl alcohol component based on the total weight of monomers in the monomer mixture.

12. The copolymer according to claim 1, wherein the vinyl ester comprises a vinyl ester of a $C_1$-$C_{13}$ saturated carboxylic acid.

13. The copolymer according to claim 1, wherein the monomer mixture further comprises up to 5 wt % of at least one cross-linking monomer based on the total weight of monomers in the monomer mixture.

14. The copolymer according to claim 1, wherein the monomer mixture further comprises up to 10 wt % based on the total weight of monomers in the monomer mixture of at least one functional monomer.

15. The copolymer according to claim 1 and having a Brookfield viscosity at 25° C. of from 100 to 10,000 mPa·s and a solids content of from 45 wt % to 70 wt %.

16. The copolymer according to claim 1 and having an average particle size between 0.1 and 5 μm.

17. A self-leveling floor screed comprising the copolymer according to claim 1 in redispersible particulate form.

18. The self-leveling floor screed according to claim 17 and further comprising at least one inorganic binder selected from gypsum and cement.

19. The self-leveling floor screed according to claim 17 and further comprising at least one extender selected from calcium and magnesium carbonates, silicates, cellulose, calcium oxide, other minerals, and mixtures thereof.

* * * * *